3,194,827
PREPARATION OF ORGANIC PHOSPHITES
Leland J. Lutz, Grand Island, and Harry N. Tatomer, Niagara Falls, N.Y., assignors to Olin Mathieson Chemical Corporation, a corporation of Virginia
No Drawing. Filed Feb. 4, 1953, Ser. No. 335,172
6 Claims. (Cl. 260—461)

Our invention relates to an improved process for the preparation of certain organic phosphites.

It is known in the art to prepare dialkyl hydrogen phosphites by reacting a suitable alcohol and phosphorus trichloride. For example, di-isopropyl hydrogen phosphite has been prepared by reacting isopropyl alcohol and phosphorus trichloride in accordance with the following equation:

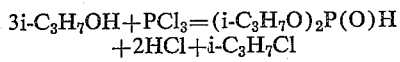

The hydrogen chloride formed as a by-product may react with the di-isopropyl hydrogen phosphite in accordance with the following equation to form mono-isopropyl phosphite and isopropyl chloride:

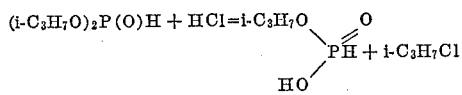

This reaction is disadvantageous, since it results in a decreased yield of the desired di-isopropyl hydrogen phosphite. As a result, when isopropyl alcohol and phosphorus trichloride have been reacted according to the prior art in order to produce di-isopropyl hydrogen phosphite, the reactants have been initially mixed in a mixing zone, suitably provided with a mixing orifice, from which the reaction mixture has been passed to a vessel provided with a vent through which a portion of the hydrogen chloride has been released at atmospheric pressure. The reaction mixture has then been passed through a cooler in order to cool it to $-10°$ C., thereby lowering the rate of the secondary hydrolysis reaction, and after the cooler the reaction mixture has been fed to a vacuum distillation column from which the isopropyl chloride and remaining hydrogen chloride have been taken overhead and the di-isopropyl hydrogen phosphite has been removed from the bottom as product. This procedure is disadvantageous because of the expense involved in providing suitable equipment for refrigerating the reaction mixture to $-10°$ C. and also because of the cost of operating that equipment.

In accordance with our invention we have been able to provide an improved method for producing in high yield di-isopropyl hydrogen phosphite and other phosphites of the formula:

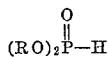

wherein R is an alkyl or cycloalkyl radical having not more than 8 carbon atoms, by the reaction of isopropyl alcohol or other appropriate alcohol and phosphorus trichloride. Thus, we have provided a process in which the use of elaborate cooling means designed to reduce the temperature of the reaction mixture to $-10°$ C. before fractional distillation is unnecessary. We accomplish our improved result by passing a mixture of the alcohol and phosphorus trichloride through a short mixing zone which is operated under a vacuum at an absolute pressure below 100 mm. of mercury and preferably within the range from about 20 to about 50 mm. of mercury, and then, without removal of hydrogen chloride, into a fractionating column which is operated under vacuum at an absolute pressure below 100 mm. of mercury and preferably within the range from about 20 to about 50 mm. of mercury. We operate the vacuum fractionating column in such manner as to remove hydrogen chloride and the organic chloride produced overhead, the desired phosphite product leaving the column as a bottoms product.

The following example illustrates one embodiment falling within the scope of our invention.

*Example*

The apparatus used comprises a fractionating column about 7 feet high and one foot in diameter provided with an inlet line located in the lower half of the column. Above the inlet line the column was packed for a height of about three feet with 1½ inch porcelain Raschig rings and below the inlet line the column was similarly packed for a distance of about one foot. The inlet line was a horizontal one inch jacketed pipe which at its end farthest removed from the distillation column was provided with a mixing orifice and also with a T the branches of which served as means for introducing the isopropyl alcohol and phosphorus trichloride.

In operating the apparatus, 37.4 pounds per hour of phosphorus trichloride and 48.6 pounds per hour of isopropyl alcohol were introduced into the T. Immediately before the mixing orifice the temperature of the reaction mixture rose to about 80° C., and in passing through the one inch pipe the temperature of the reaction mixture was cooled as a result of vaporization of the products of reaction under the vacuum conditions existing in the pipe, so that the temperature of the reaction mixture upon being introduced into the packed column was 50° C. In order to maintain proper operating conditions in the fractionating column, 30 p.s.i.g. steam was passed through a heating coil located in the bottom of the column at a rate of one-half pound per minute so that the liquid in the bottom of the column was boiling and was at a temperature of 102° C. At about the middle of the column, the temperature was 76° C. and the temperature of the overhead vapors was 64° C. The absolute pressure at the top of the tower was 35 mm. of mercury. Reflux was returned to the top of the column at a rate of 300 ml. per minute. By operating the column in this manner, hydrogen chloride and isopropyl chloride, together with a small amount of di-isopropyl hydrogen phosphite, were taken overhead. Analysis showed that combined phosphorus was removed from the bottom of the tower at a rate of 7.66 pounds per hour, and 97.4 percent of the combined phosphorus was in the form of di-isopropyl hydrogen phosphite. If desired, the bottoms product can be further purified by additional vacuum fractionation.

Various modifications can be made in the specific procedure just described in order to provide further embodiments which fall within the broad scope of our invention. Thus, in place of the isopropyl alcohol used, there can be substituted other alkyl or cycloalkyl monohydric alcohols having not more than 8 carbon atoms, such as methanol, ethanol, n-propanol, n-amyl alcohol, 2-ethyl hexanol, cyclohexanol, a methyl cyclohexanol, and so forth. The relative amounts of alcohol and phosphorus trichloride used can be varied rather widely, the molar ratio of alcohol to phosphorus trichloride utilized generally being within the range from about 2.5 to about 3.5. We prefer to use at least the stoichiometric amount of the alcohol or a small excess, in order to provide for complete consumption of the phosphorus trichloride.

We claim:

1. A method for the preparation of phosphites which comprises mixing in a short mixing zone maintained at an absolute pressure below 100 mm. of mercury phosphorus trichloride and a compound of the formula ROH and then introducing the reaction mixture into a fractionating column operating at an absolute pressure below 100 mm. of mercury, and removing hydrogen chloride and a compound of the formula RCl as overhead and a compound of the formula $(RO)_2P(O)H$ as bottoms from the column, R in the foregoing formulas being a hydrocarbon radical selected from the group consisting of alkyl radicals containing not more than 8 carbon atoms, cyclohexyl and methylcyclohexyl, the phosphorus trichloride and ROH being the only materials introduced into the mixing zone.

2. A process according to claim 1 in which the mixing zone and the fractionating column are operated at an absolute pressure within the range from about 20 to about 50 mm. of mercury.

3. A process according to claim 1 in which the molar ratio of ROH to phosphorus trichloride is within the range from about 2.5 to about 3.5.

4. A process according to claim 1 in which R is the isopropyl radical.

5. A process according to claim 1 in which R is the methyl radical.

6. A process according to claim 1 in which R is the ethyl radical.

References Cited by the Examiner

UNITED STATES PATENTS

| | | | |
|---|---|---|---|
| 2,582,817 | 1/52 | Chadwick | 260—461 |
| 2,631,161 | 3/53 | Haufe et al. | 260—461 |

FOREIGN PATENTS 684,835  12/52  Great Britain.

CHARLES B. PARKER, *Primary Examiner.*

ROGER L. CAMPBELL, WILLIAM WILES, REUBEN EPSTEIN, *Examiners.*